(12) United States Patent
Doi (10) Patent No.: US 8,700,680 B2
(45) Date of Patent: Apr. 15, 2014

(54) DECODER COMPILER, COMPUTER READABLE MEDIUM, AND COMMUNICATION DEVICE

(75) Inventor: Yusuke Doi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 13/235,880

(22) Filed: Sep. 19, 2011

(65) Prior Publication Data

US 2012/0254231 A1 Oct. 4, 2012

(30) Foreign Application Priority Data

Mar. 28, 2011 (JP) ................ 2011-070244

(51) Int. Cl.
*G06F 17/30* (2006.01)

(52) U.S. Cl.
USPC .......................................... 707/804

(58) Field of Classification Search
USPC .......................................... 707/804
See application file for complete search history.

(56) References Cited

U.S. PATENT DOCUMENTS

| 7,970,802 | B2 | 6/2011 | Ishizaki | |
| 2008/0133557 | A1* | 6/2008 | Ishizaki | 707/100 |
| 2009/0063954 | A1 | 3/2009 | Shimizu | |
| 2009/0287625 | A1* | 11/2009 | Fablet et al. | 706/45 |

FOREIGN PATENT DOCUMENTS

| JP | 10-240652 A | 9/1998 |
| JP | 2004-234405 A | 8/2004 |
| JP | 2008-140179 A | 6/2008 |
| JP | 2009-059215 A | 3/2009 |
| JP | 2010-250434 A | 11/2010 |

OTHER PUBLICATIONS

EXI 1.0 Encoding Examples, Apr. 10, 2008, pp. 1-24.*
Efficient XML Interchange (EXI) Primer, Dec. 8, 2009, pp. 1-30.*
Japanese Office Action dated Feb. 15, 2013 (and English translation thereof) in counterpart Japanese Application No. 2011-070244.
Shuichi Mitarai et al.: "Light-weight Acceleration for Streaming XML Document Filtering": The Database Society of Japan Letters, Japan: The Database Society of Japan: Jun. 29, 2007: vol. 6, No. 1: pp. 81-84.

* cited by examiner

*Primary Examiner* — Albert Phillips, III
(74) *Attorney, Agent, or Firm* — Holtz, Holtz, Goodman + Chick, PC (57) ABSTRACT

Information that maps a point in XML document structure to a name of a variable and an EXI grammar form that includes grammars each defining relationship among an event representative of an element in the XML document structure, an EXI event code, and a next grammar for use are read. A selecting unit selects grammars in the EXI grammar form such that the grammars are traced in sequence. A determining unit updates a grammar stack which identifies a current position in the XML document structure each time a grammar is selected. If the updated stack does not indicates the point, a function setting unit sets a skip function for skipping a corresponding value in an EXI stream, otherwise, sets a read function for reading and providing the corresponding value to a corresponding variable. A composer generates an EXI decoder including skip and read functions set for individual grammars.

5 Claims, 10 Drawing Sheets

DECODER COMPILER, COMPUTER READABLE MEDIUM, AND COMMUNICATION DEVICE

CROSS REFERENCE TO RELATED APPLICATIONS

This application is based upon and claims the benefit of priority from the prior Japanese Patent Application No. 2011-70244, filed on Mar. 28, 2011, the entire contents of which are incorporated herein by reference.

FIELD

An embodiment of the present invention relates to a decoder compiler and a computer readable medium for generating an EXI (EXI (Efficient XML (Extensible Markup Language) Interchange)) decoder, and a communication device including the EXI decoder.

BACKGROUND

A configuration of an ASN.1 decoder is disclosed in JP-A 10-240652 (Kokai). It generates a decoder program through interpretation by a finite state machine based on ASN.1.

ASN.1 generally limits information that can be described for communication and is premised on acquisition of all information. It thus allows parsing to be performed for all possibilities even in an embedded device.

In contrast, EXI is an XML-based technique intended for environments with richer computation resources, and for correct decoding of information, it requires interpretation of information other than information required for a device, including interpretation of XML schema defining document structure of XML. This both complicates decoder coding and increases processing load on a device and/or memory.

DETAILED DESCRIPTION

According to an aspect of embodiments, there is provided a decoder compiler that generates an EXI (Efficient XML (Extensible Markup Language) Interchange) decoder, the EXI decoder decoding an EXI stream being a sequence of a plurality of EXI event codes and a value.

The decoder includes a first reading unit, a second reading unit, a grammar selecting unit, an update determining unit, a skip function setting unit, a read function setting unit and a code composer.

The first reading unit reads mapping information that maps a point in XML document structure defined by a XML schema to a name of a variable, the XML document structure including a plurality of elements.

The second reading unit reads an EXI grammar form including a plurality of grammars each defining relationship among an event representative of the element in the XML document structure, an EXI event code, and a next grammar for use.

The grammar selecting unit sequentially selects grammars in the EXI grammar form from a start grammar such that the grammars are traced in sequence.

The update determining unit updates a grammar stack which identifies a current position in the XML document structure each time the grammar is selected and determines whether an updated grammar stack indicates the point shown in the mapping information.

The skip function setting unit sets a skip function when the updated grammar stack does not indicate the point in the mapping information. The skip function skips a value in the EXI stream that corresponds to the position indicated by the grammar stack when the skip function is executed.

The read function setting unit sets a read function when the updated grammar stack indicates the point in the mapping information. The read function reads a value in the EXI stream that corresponds to the position indicated by the grammar stack, and provides the value mapped to a variable corresponding to the point when the read function is executed.

The code composer generates an EXI decoder which includes the skip function and the read function set for the grammars.

An embodiment of the invention will be described with reference to drawings.

Figure 1:
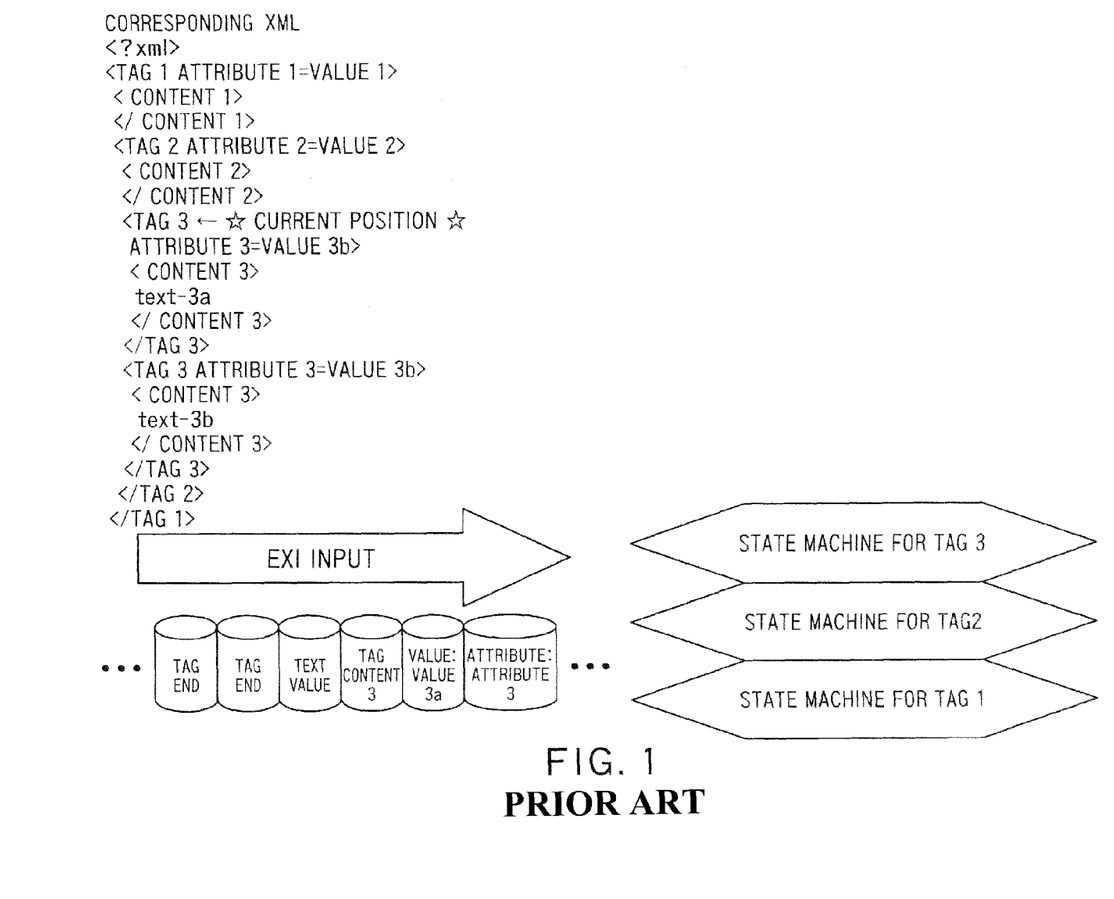
FIG. 1 is a diagram for illustrating operation of an EXI decoder as background information for describing an embodiment of the present invention.

FIG. 1 is a diagram for illustrating operation of an EXI decoder as background information for describing the embodiment of the invention.

An EXI (Efficient XML (Extensible Markup Language) Interchange) stream is a sequence of events originally generated from an XML document, and is an event stream in which construction (event codes), such as tag start, tag end, attributes in the XML document, and values (data) included in the construction are arranged in a row. Such an EXI stream is given to an EXI decoder for decoding.

In an XML document, tags are nested. Based on XML characteristics (such as schema), an order of events permitted in a stream is determined. An EXI decoder is constructed in the form of a state machine for interpreting the events.

Processing performed by the EXI decoder includes producing a state machine for interpreting syntax inside a tag at the start of a tag and exiting the state machine upon ending of the tag. Nesting relationship among tags is represented by a stack of state machines, and an EXI decoder is constructed by preparing a mechanism for configuring the stack in accordance with contents of the stream. A typical EXI decoder reconstructs the original XML document from state transition of the state machines.

The embodiment of the invention provides an EXI decoder intended for limited application, such as inclusion into an embedded device among others. Specifically, the present invention is aimed at generation of an EXI decoder that outputs only portions of an EXI stream that are relevant to a use (structure values as described later), rather than utilizing (reconstructing) an XML document, which is a structured document with a high degree of freedom, in its entirety. The present embodiment proposes a decoder compiler (a decoder generator) for generating such an EXI decoder (a dedicated EXI decoder).

Figure 2:
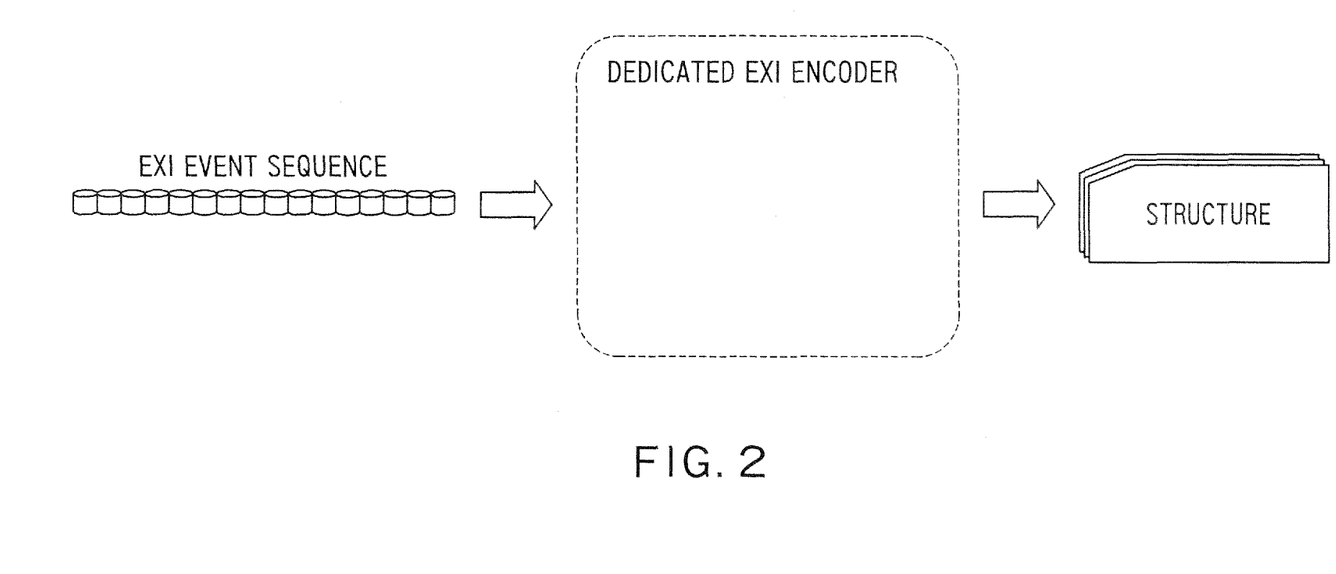
FIG. 2 conceptually shows operation of a dedicated EXI decoder generated according to the embodiment of the invention.

FIG. 2 conceptually shows the operation of a dedicated EXI decoder generated according to the present embodiment.

The dedicated EXI decoder receives an EXI stream as input and outputs a structure (a memory image) having a certain construction. In the example of FIG. 1, for instance, a decoder targeted for a structure in which content 1, content 2, and content 3 are defined outputs only values for contents 1, 2 and 3 and does not reconstruct the entire XML document. That is, of all XML document information input as an EXI stream, it discards portions that are irrelevant to a use intended on the device.

This provides the advantages of allowing processing to be described without regard for the freedom in XML for an application (such as an operation program for an embedded device) that utilizes the dedicated EXI decoder and eliminating the necessity to include code for unnecessary processing into the decoder.

Figure 3:
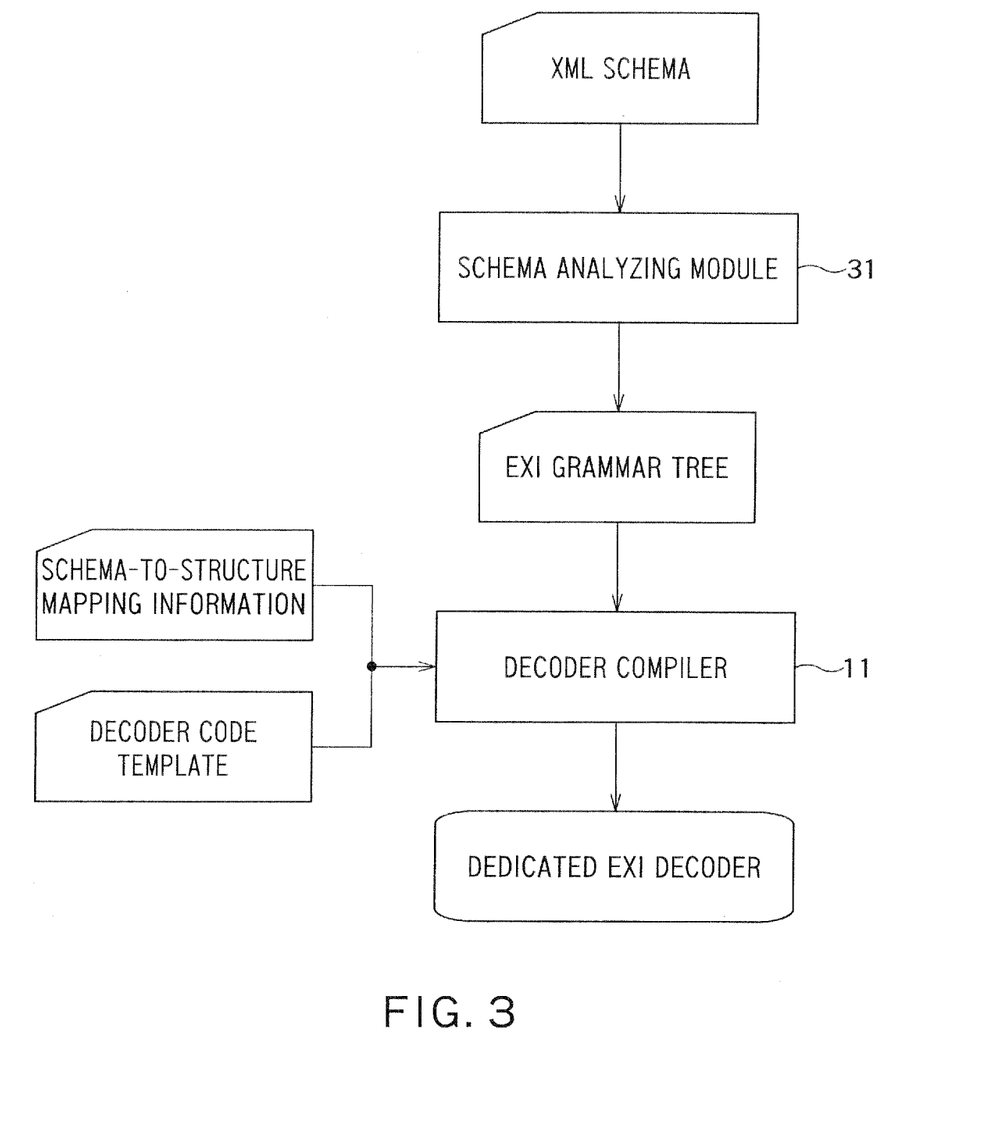
FIG. 3 shows relationship between a decoder compiler according to the present embodiment and input/output to/from the compiler.

FIG. 3 shows relationship between a decoder compiler according to the present embodiment and input and output to/from the compiler.

A decoder compiler 11 receives as inputs an EXI grammar tree generated from XML schema that governs the construction of a target XML document, schema-to-structure mapping information that maps schema to an output structure, and a code template (a code fragment dictionary) for a decoder. The EXI grammar tree is generated by converting XML schema with a schema analyzing module 31. The decoder compiler 11 generates a dedicated EXI decoder based on these inputs.

Appendix A.1 shows an XML document used for description.

An XML document is described with various elements, including tag name, attribute, attribute value, and main body. The dedicated EXI decoder according to the present embodiment decodes an EXI stream as input in which such an XML document is encoded and extracts only necessary information.

Appendix A.2 shows an example of XML schema used in this description.

XML schema defines a construction permitted for an XML document. The schema example is cited from Reference Literature 1 (John Schneider and Takuki Kamiya, Efficient XML Interchange (EXI) Format 1.0.W3C Candidate Recommendation, December 2009, http://www.w3.or/TR/exi/). The XML document of Appendix A.1 conforms to the XML schema of Appendix A.2.

Appendix A.3 shows an example of EXI grammar generated from the schema of Appendix A.2.

It includes multiple grammars defining the relationship between events representing elements of XML document structure, EXI event codes, and the next grammar for use. The present embodiment assumes use of SAX events as XML events.

SAX parsers for converting an XML document into an SAX event sequence are well known. An encoding device converts an XML document to an SAX event sequence and generates an EXI stream from the SAX event sequence and EXI grammar. An EXI stream is a stream including EXI event codes and values associated with the EXI event codes.

While the EXI stream may be generated in an arbitrary manner on the encoding side, it can be done as follows, for example. From the beginning of an SAX event sequence, corresponding EXI event codes are sequentially identified from the current grammar in the EXI grammar tree. When an SAX event designates a value, the value is retrieved, and the next grammar for use is identified from the EXI grammar tree. By repeating this to the end of the SAX event sequence, an EXI stream including EXI event codes and values can be obtained.

Appendix A.4 shows an example of schema-to-structure mapping information.

Essential components of schema-to-structure mapping information are:

(1) A structure that should be output and its type

In the example, this corresponds to the portion "struct product" and element declaration (such as w_char*sku) in each row. More specifically, "struct product" is the name of a structure, "sku" is an element name, and "w_char*" is a type.

(2) XPath indicating the start position of an XML tag to which the structure corresponds (alternatively, a designator equivalent to XPath which indicates a document position). In the example, "/order/product" represents XPath indicating a tag start position. This means that the range from <product>, which is under <order>, to the corresponding </product> in the XML document is the range in which information corresponding to one structure is present (a BODY portion described later).

(3) Relative path from the XPath position for identifying the position of a structure element (alternatively, an equivalent designator).

In the example, "@sku;" and "quantity/text( )" represent relative paths. In the former case, the position of attribute value of the "product" tag corresponds to the position of a structure element (such as "sku"). In the latter case, a portion of main body surrounded by "quantity" tags represents the position of a structure element ("quantity").

(4) Type converting functions used for storing values included in an XML document (i.e., values sent in an EXI stream) into elements of the structure (1).

In the example, "utf2wchar" and "utf2float" represent type converting functions. "utf2wchar" is a function for converting value type from "utf" to "wchar". "utf2float" is a function for converting value type from "utf" to "float". "Utf" is a type defined for use in XML schema.

When there is only one element, a structure need not be used and a variable may be defined. Elements of a structure are sometimes called variables in the present embodiment.

Figure 4:
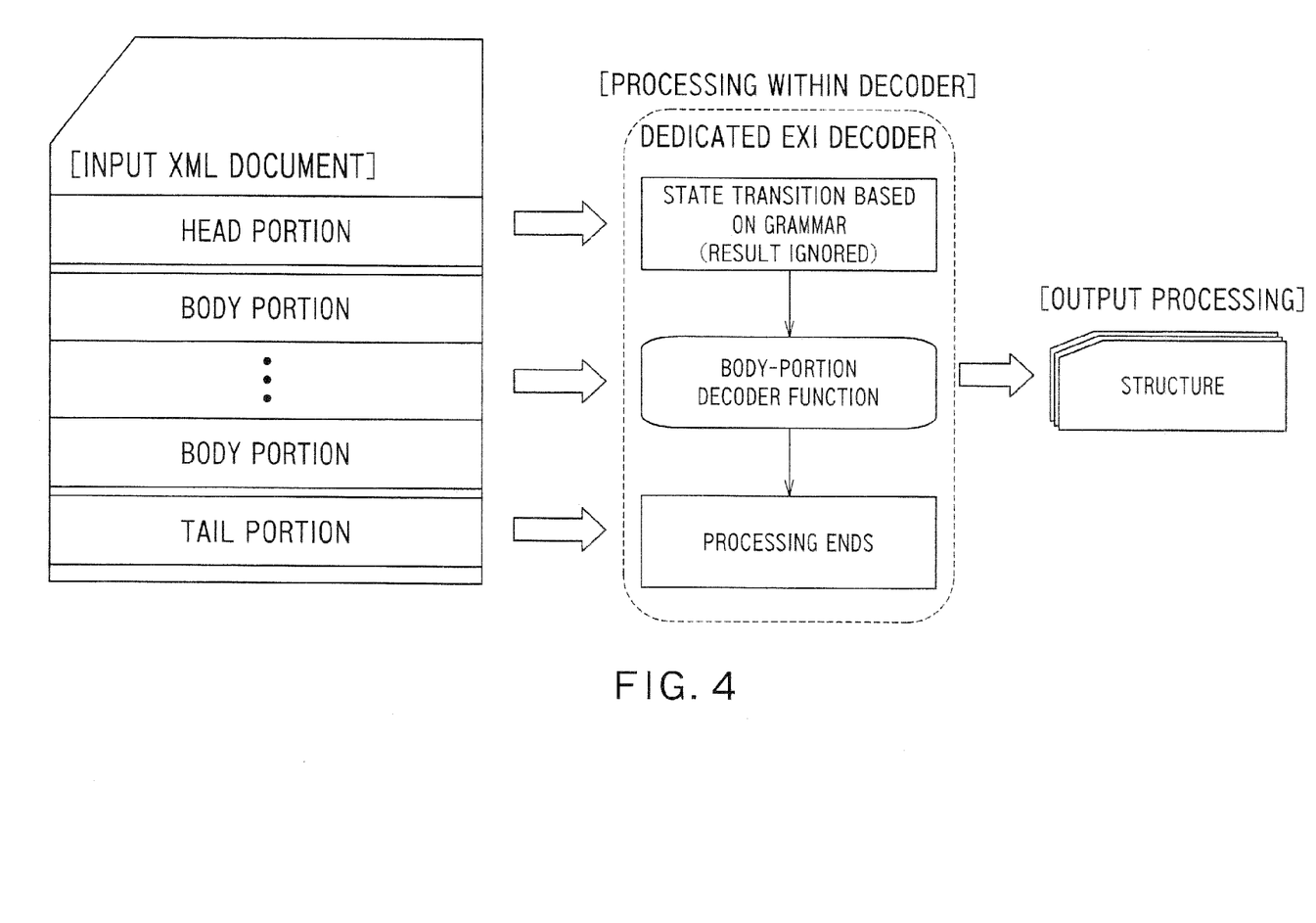
FIG. 4 illustrates the relationship between contents of an XML document constituting an EXI stream and the internal configuration of a dedicated EXI decoder.

Using FIG. 4, the relationship between contents of an XML document constituting an EXI stream and internal configuration of a dedicated EXI decoder generated according to the present embodiment will be described.

In processing by the dedicated EXI decoder, an input XML document (an EXI stream) is skipped over to a point at which a start position tag in "schema-to-structure mapping information" (<product> under <order>) is present.

Only necessary elements are read from the start position tag in sequence, and the result of their decoding is output in the form of structures. When such elements have been read, decoding ends.

More specifically, an XML document can be divided into three parts, HEAD, BODY, and TAIL portions, as illustrated in the figure. The HEAD portion is a part up to immediately before a start position tag in "schema-to-structure mapping information" (<product> under <order>). The TAIL portion is a part from immediately after the end of the tag (in this example, immediately following <product>) to the end of the document. The BODY portion is from the start position tag to the end tag (<product> to </product>). In the example of Appendix A.1, a BODY portion is repeated three times.

Such division into HEAD, BODY, and TAIL portions facilitates processing. Because HEAD and TAIL portions include no information corresponding to structures, they may be entirely skipped. Decoding is designed specifically for the BODY portion so that necessary elements can be read from it. Such processing is carried out by a BODY decoder function shown in the figure. Division into HEAD, BODY and TAIL portions is not a requirement of the present embodiment and processing described below may be performed without such division.

Figure 5:
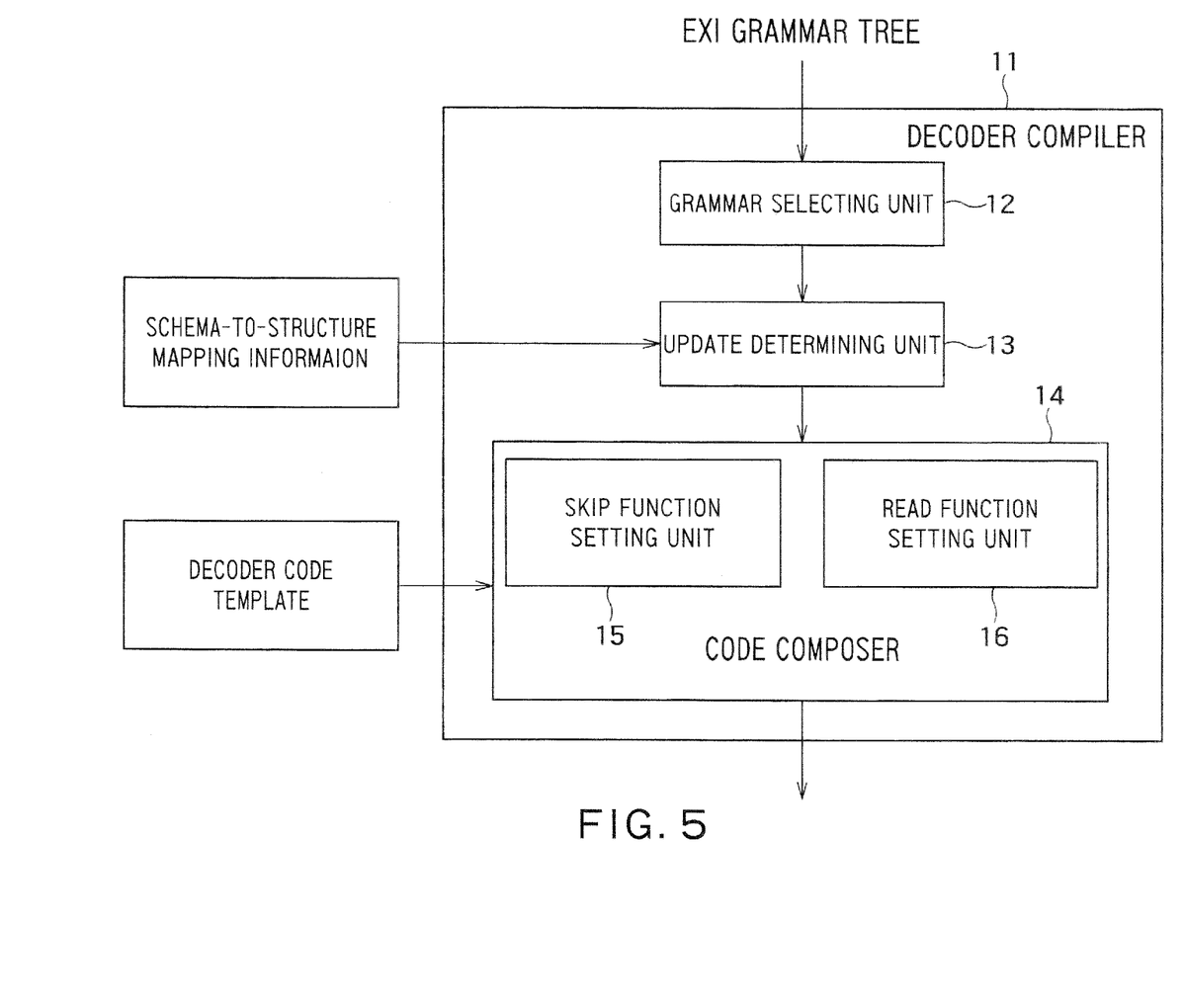
FIG. 5 shows a configuration of the decoder compiler according to the embodiment of the invention.

FIG. 5 shows a configuration of the decoder compiler 11 according to the present embodiment.

The decoder compiler 11 includes a grammar selecting unit 12, an update determining unit 13, and a code composer 14. The code composer 14 includes a skip function setting unit 15 and a read function setting unit 16.

The decoder compiler 11 receives as inputs an EXI grammar tree, schema-to-structure mapping information, and a code template (a code fragment dictionary). The decoder compiler 11 includes a first reading unit which reads schema-to-structure mapping information and a second reading unit which reads an EXI grammar tree. The reading units read into the same or different storage device(s). Reading may also be performed via a network.

The grammar selecting unit 12 sequentially selects grammars in the EXI grammar tree from a predetermined start grammar along the tree.

The update determining unit 13 serially updates a grammar stack indicating the position in XML document structure each time the grammar selecting unit 12 selects a grammar. The update determining unit 13 determines whether the updated grammar stack indicates a point specified by schema-to-structure mapping information.

The code composer 14 sets a function for a selected grammar in accordance with the result of determination by the update determining unit 13.

When the grammar stack does not indicate the point specified by schema-to-structure mapping information, the skip function setting unit 15 is used to set a skip function for skipping the value at the position indicated by the grammar stack for the selected grammar.

When the grammar stack indicates the point specified by schema-to-structure mapping information, a read function is set that reads the value at the position indicated by the grammar stack from the EXI stream and provides the value to a structure element (or a member) corresponding to the position.

The code composer 14 generates an EXI decoder that includes skip and read functions selected for individual grammars. In addition to the functions, instruction codes that are essentially necessary for decoding are also included in the EXI decoder. For example, such instruction codes include one for sequentially taking EXI events from the beginning of an EXI stream at the start grammar and selecting the next grammar for use in accordance with an EXI event taken based on the EXI grammar tree and the current grammar, one for executing a function associated with the current grammar (a skip or read function) when a value is associated with an EXI event code and processing the value associated with the EXI event taken, and one for outputting a structure value read out in response to execution of a read function.

Processing performed by the code composer 14 is described in greater detail below.

Figure 6:
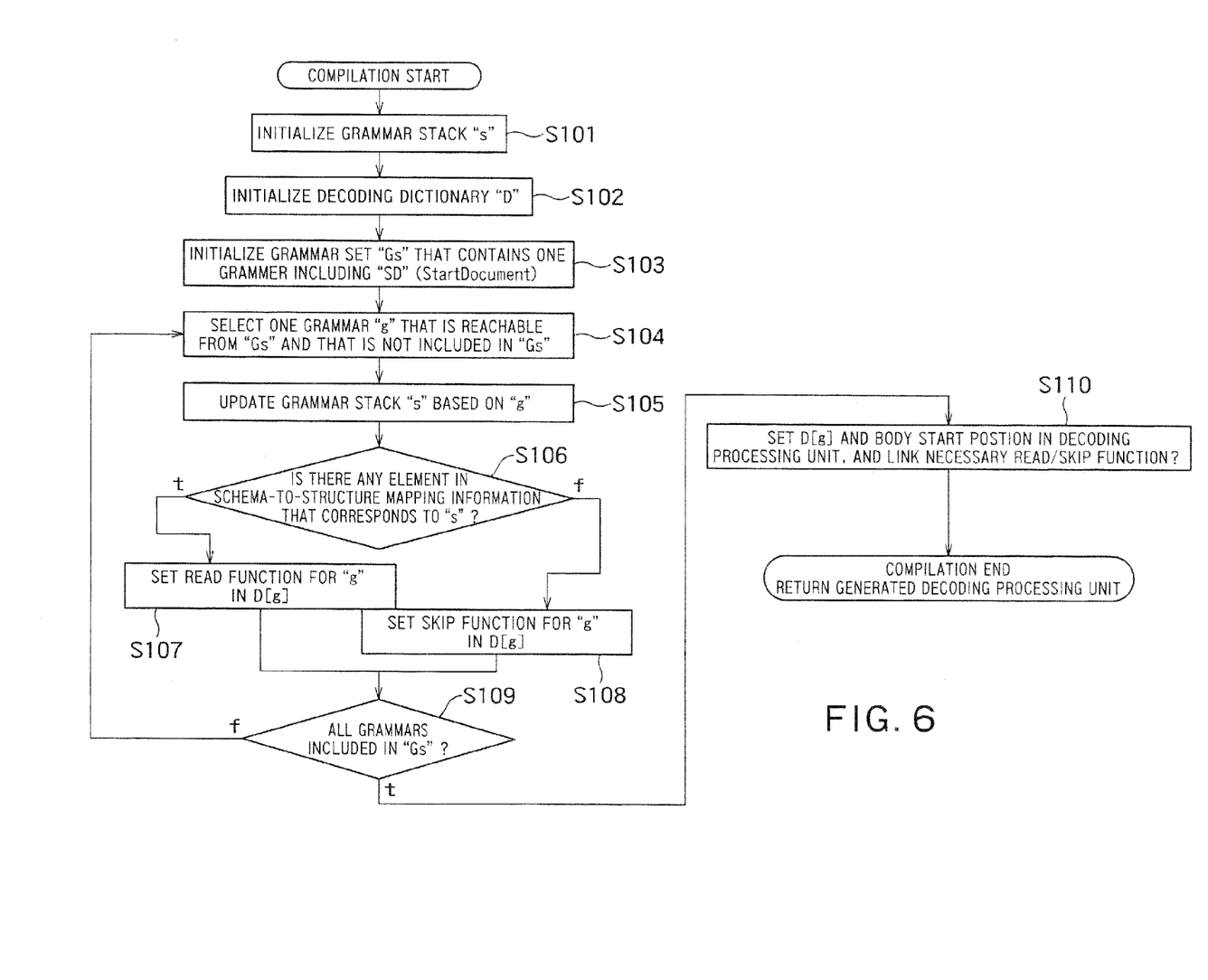
FIG. 6 is a flowchart illustrating an exemplary flow of processing performed by the decoder compiler according to the embodiment of the invention.

FIG. 6 is a flowchart illustrating an exemplary flow of processing by the decoder compiler 11 according to the present embodiment.

The decoder compiler 11 has a grammar stack "s" and a decoder dictionary "D" and initializes them (S101 and S102).

The decoder dictionary "D" is a dictionary based on EXI grammar and event codes for storing code fragments for a dedicated EXI decoder to be generated.

The grammar stack is a stack of grammars, serving as a clue to identify a portion of the XML document to which a grammar analysis tree corresponds. To be specific, each grammar stack corresponds to an event, such as tag and attribute, and collecting and arranging labels indicative of tag contents from each stack provides an approximation of XPath tag path indication (order and the like are not described).

A grammar set "Gs" indicating already processed grammars is initialized (S103). An input EXI grammar always includes one start grammar (a grammar equivalent to StartDocument in XML) and "Gs" has the start grammar as its initial value. Stack status corresponding to the start grammar is empty.

Here, a concept of "reachable" is defined.

The EXI grammar consists of four portions: LeftHandSide, Terminal, NonTerminal, and EventCode. When a "Terminal" event occurs in LeftHalldSide state, EventCode is output and transition to NonTerminal state occurs. When there is a grammar that transitions from LeftHandSide "g1" to NonTerminal "g2" state, state "g2" is reachable from "g1".

This is described with respect to the example of Appendix A.3, for instance. In the context of conversion of an XML event into an EXI event, if an AT("color") event occurs in Use_color0 state in the grammar for <product>, event code 0 (one-bit zero) is output and transition to Use_color1 state takes place.

A main process of the decoder compiler 11 is repetition of selecting one grammar that is reachable from a grammar included in "Gs" and that is not included in "Gs" with the grammar selecting unit 12 (S104) and creating a decoder dictionary for that grammar. When there are two or more grammars that can be selected, they will be selected in the next and subsequent loops. Thus, the following process is repeated (S105 through S109) until all grammars included in the EXI grammar (see Appendix A.3) have been processed.

A selected grammar is denoted as "g". The grammar stack "s" is updated by the update determining unit 13 placing grammars corresponding to "g" on grammar stack "s" for grammars that have reached "g". The grammar stack "s" is updated as in EXI: a new item is created on the stack when an event corresponds to SE (StartElement) for tag start and the top item of the stack is removed when an event corresponds to EE (EndElement) for tag end.

The update determining unit 13 determines to which portion of XML the current grammar corresponds based on grammar stack "s" and grammar "g". Specifically, each item in the grammar stack corresponds to a level in XML tag hierarchy and "Terminal" in grammar "g" (in the example of Appendix A.3, a value in parentheses specified by an SAX event such as AT and SE) corresponds to a structure element, a character string or the like.

For an element of a structure in "schema-to-structure mapping information," summation of start tag position and the relative position of that element yields the position of the element in the XML document.

If a start tag is included in grammar stack "s" and the relative position of an element corresponds to grammar stack "s" or grammar "g" ("true" at S106), a "read function" is set by the read function setting unit 16 as decoder dictionary D[g].

The read function is a function to read the corresponding value and outputs it after type conversion through a converting function. It uses a converting function indicated in schema-to-structure mapping information.

If no corresponding element is present in grammar stack "s" or grammar "g" ("false" at S106), a "skip function" is set by the skip function setting unit 15 as decoder dictionary D[g].

Grammar "g" is added to grammar set "Gs" and determination is made as to whether all grammars have been stored in "Gs" (S109). If not ("false"), the flow returns to step S104. When all grammars are stored in grammar set "Gs" ("true"), the flow proceeds to step S110.

At step S110, decoder dictionary D[g] for each of the grammars in grammar set "Gs" is set to the code template for the decoder and necessary functions are linked to thereby produce an EXI dedicated decoder.

The above-described procedure is described using the EXI grammar of Appendix A.3 and schema-to-structure mapping information of Appendix A.4 as examples.

The start tag in schema-to-structure mapping information is "/order/product". When the grammar stack "s" comes to Term_order/Term_product, it corresponds to "/order/product". It is assumed that Term_order indicates a state in which an EXI event corresponding to SE ("order") has been read and Term_product indicates a state in which an EXI event corresponding to SE ("product") has been read.

The following two grammars (Use_color0: and Use_color1:) include structure elements corresponding to attribute. Complete Grammar for Element <Product>

| Use_color0: | | |
|---|---|---|
| AT("color") [schema-typed value] Use_color1 | 0 | |
| AT("sku") [schema-typed value] Use_sku1 | 1 | |
| AT("color") [untyped value] Use_color1 | 2.4.0 | |
| AT("sku") [untyped value] Use_sku1 | 2.4.1 | |
| Use_color1: | | |
| AT("sku") [schema-typed value] Use_sku1 | 0 | |
| AT("sku") [untyped value] Use_sku1 | 1.2.0 | |

AT ("color") corresponds to "@color" and AT ("sku") corresponds to "@sku".

Accordingly, for the grammar for "Use_color0:", a read function is set that reads the values of attributes "color" and "sku" of "product" tag, converts their type from "utf" to "wchar", and then inputs the converted values into structure elements "w_char*sku" and "w_char*color". Similarly for the grammar for "Use_color1:", a read function is set as decoder dictionary D[g] for the grammar.

"Quantity/text( )" and "price/text( )" correspond to the grammar:
Complete Grammar for Element <Product>

| Term_quantity0,1: | 2.1 |
|---|---|
| CH [untyped value] Term_quantity0,1 | |
| Term_price0,1: | 3.1 |
| CH [untyped value] Term_price0,1 | |
| Term_quantity1,1: | 2.1 |
| CH [untyped value] Term_quantity1,1 | |
| Term_price1,1: | 1.1 |
| CH [untyped value] Term_price1,1 | |

Since "text( )" corresponds to "CH(Character)", the grammar above corresponds to each element.

Accordingly, for the grammar for "Term_quantity0,1:", a read function is set that reads the value of an EXI event equivalent to SE(quantity) (the value of main body in "quantity" tag in the context of an XML document), performs type conversion from "int" to "utf", and then inputs the converted value into a structure element "int quantity". Similarly for each of grammars for "Term_Price 0,1;", "Term_quantity1,1:", and "Term_price1,1"; a read function is set as decoder dictionary D[g].

In summary, values, if any, are given following event codes in an EXI stream, and a function for inputting the values into structures is described in decoder dictionary "D" for the corresponding grammar.

In other words, a function to convert a read-out value (of "utf" type) to "char" or "int/float" through "utf2wchar" or "utf2int/utf2float" is described in decoder dictionary "D" for the corresponding grammar.

For a grammar that does not correspond to schema-to-structure mapping information, a function for skipping values (i.e., unwanted information) after reading event codes is described in decoder dictionary D (if no value is present, a null may be described instead of a skip function).

The operation of the dedicated EXI decoder generated according to the present embodiment is shown below.

Figure 7:
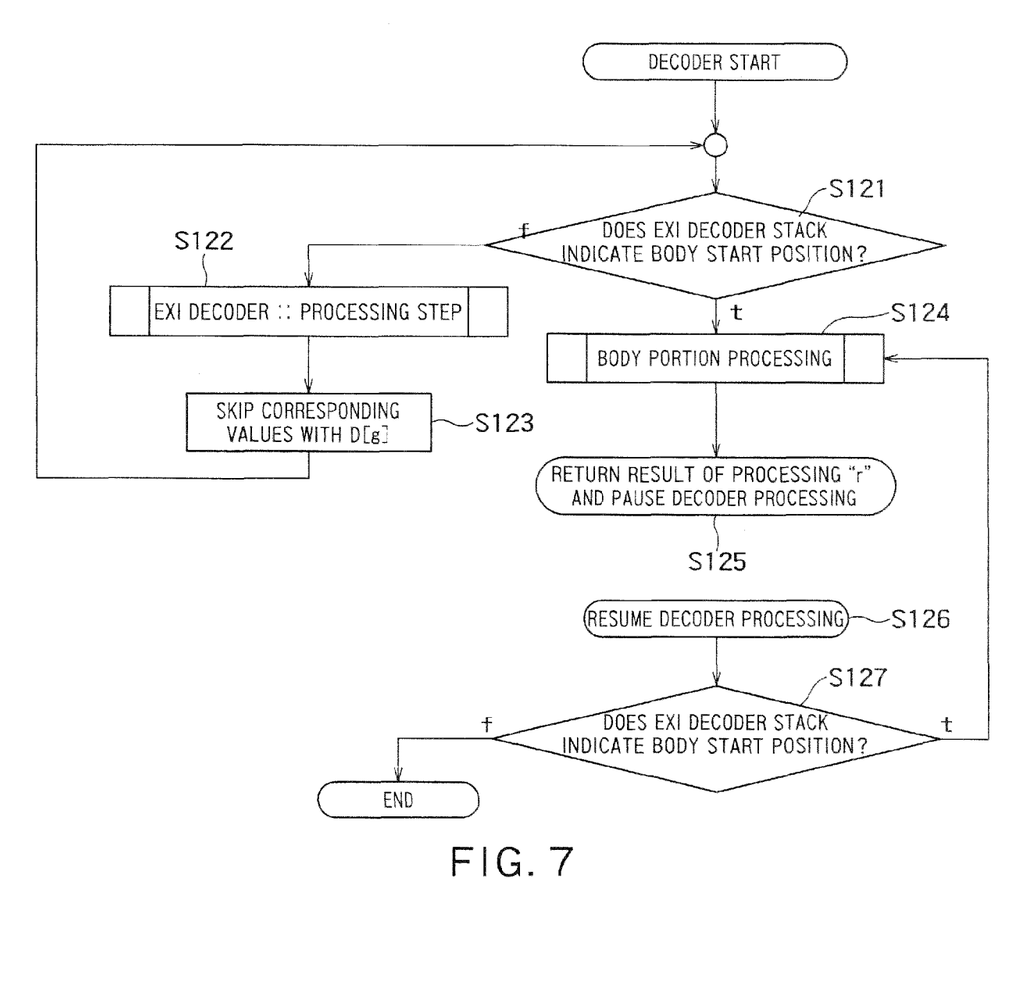
FIG. 7 shows a flow of a decoding process performed by a dedicated EXI decoder.

FIG. 7 shows a flow of a decoding process performed by the dedicated EXI decoder. The dedicated EXI decoder performs decoding on the basis of decoder dictionary "D".

The dedicated EXI decoder includes decoder features adapted for EXI grammar. But it differs from typical decoders (based on a known system) in the following respects:

1. Simply skipping a stream portion preceding the decoding start position indicated in structure-to-schema mapping information (corresponding to the HEAD portion) ("false" at S121, S122 and S123).

2. In decoding of a BODY portion (a portion of an XML document to which structure-to-schema mapping information corresponds), a structure "r" is generated on each decoding of an iterative element (e.g., <product> through </product>) and returned to the caller of the decoder ("true" at S121, S124, S125, S126, and "true" at S127).

3. When reading of the BODY portion is complete, the remaining stream (i.e., the TAIL portion) is discarded ("false" at S127).

More specifically, an EXI stream is first read from its beginning and determination is made as to whether the decoder stack indicates a BODY start position (<product>). If not ("false" at S121), "EXI decoder::processing" in FIG. 8 is executed (S122), and then values are skipped using a dictionary decoder for the current grammar (S123).

Figure 9:
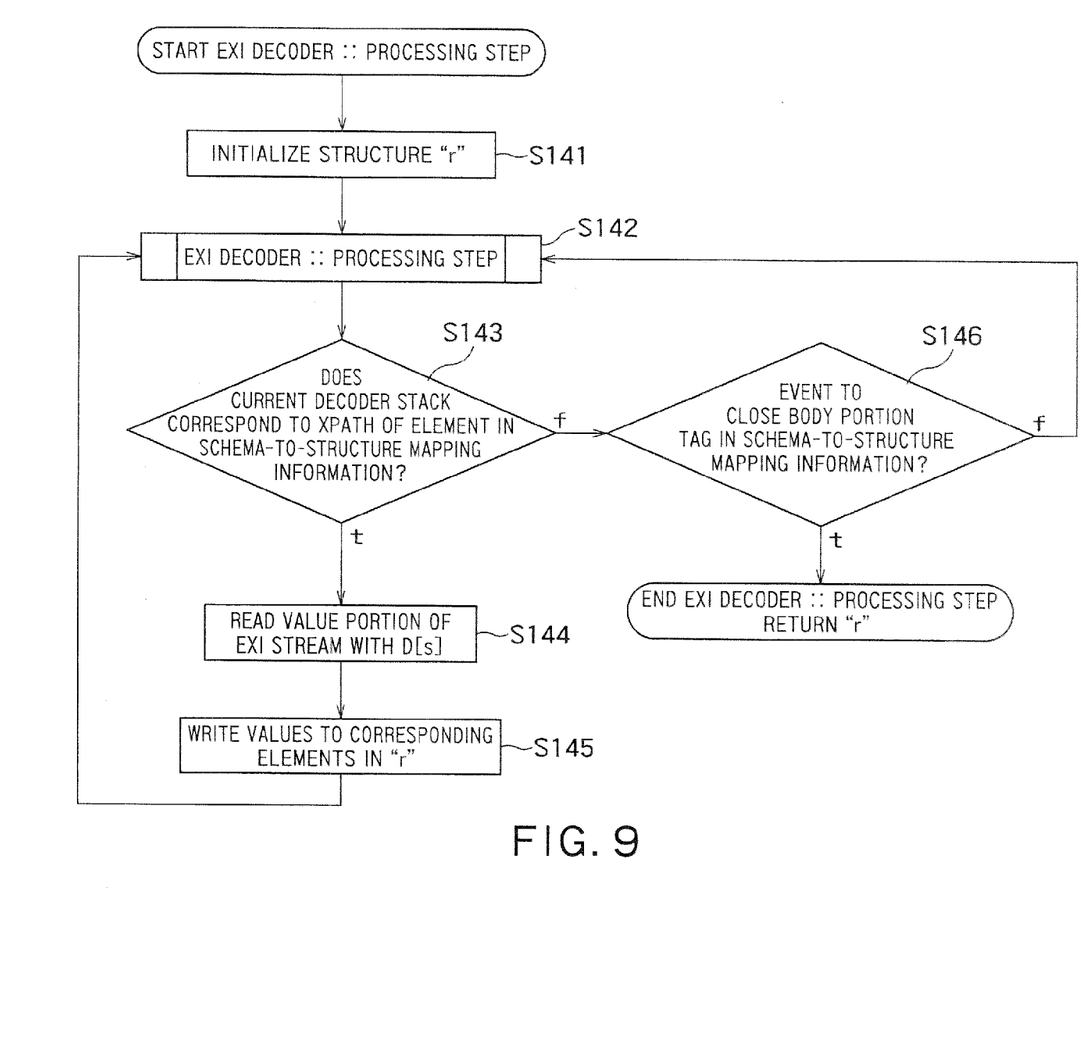
FIG. 9 is a flowchart showing a detailed flow of processing performed at step S124 of FIG. 7.

When the stack indicates a BODY start position ("true" at S121), BODY portion processing of FIG. 9 is executed (S124), a structure "r" is generated as the result of processing. If there is further BODY portion ("true" at S127), that is, if an EXI event indicating the BODY start position (<product>) is detected, the flow returns to step S124.

If there is no more BODY portion ("false" at S127), processing is then terminated and processing of EXI events in the TAIL portion is not performed.

Figure 8:
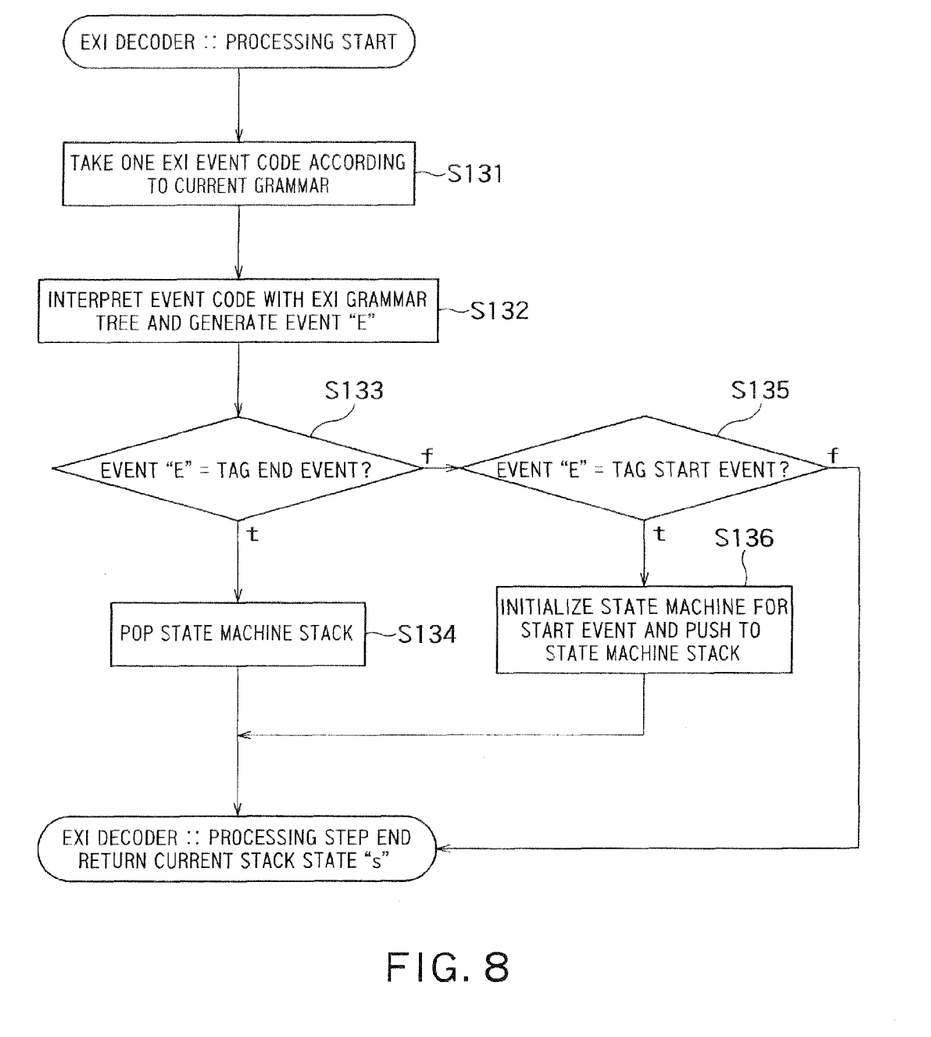
FIG. 8 is a flowchart showing a detailed flow of processing performed at step S122 of FIG. 7.

FIG. 8 shows a flow of "EXI decoder::processing" performed at step S122 of FIG. 7 or step S142 of FIG. 9 described later.

Determination is made as to whether an EXI event code being interpreted according to the current grammar indicates a tag end event (EE) or a tag start event (SE) (S131, S132, S133, S135). A state machine stack is manipulated only when the event code indicates a tag end or tag start event. Specifically, the state machine for a start event is pushed to the state machine stack if the code indicates a tag start event, and a state machine is popped from the state machine stack if the event indicates a tag end event (S136, S134). The current stack state "s" is then returned. With this manipulation, it can be checked to which portion of the document decoding corresponds at each step of the decoding process.

FIG. 9 shows a flow of BODY portion processing performed at step S124 of FIG. 7.

A structure "r" to be read from an EXI stream is initialized in accordance with structure definition included in structure-to-schema mapping information (S141), "EXI decoder::processing" of FIG. 8 is performed (S142), and it is determined whether the current grammar stack corresponds to XPath of an element in schema-to-structure mapping information (S143).

If the current grammar stack corresponds to XPath of the element ("true"), a value portion of the EXI stream is read using a dictionary decoder for the current grammar, and values read out are written into appropriate elements of the structure "r" (S144, S145).

However, if the grammar stack does not correspond to XPath of the element ("false"), it is checked whether the current EXI event is an event for closing the BODY portion tag. If the result is "true", the process is terminated, and if "false", the flow returns to step S142.

Figure 10:
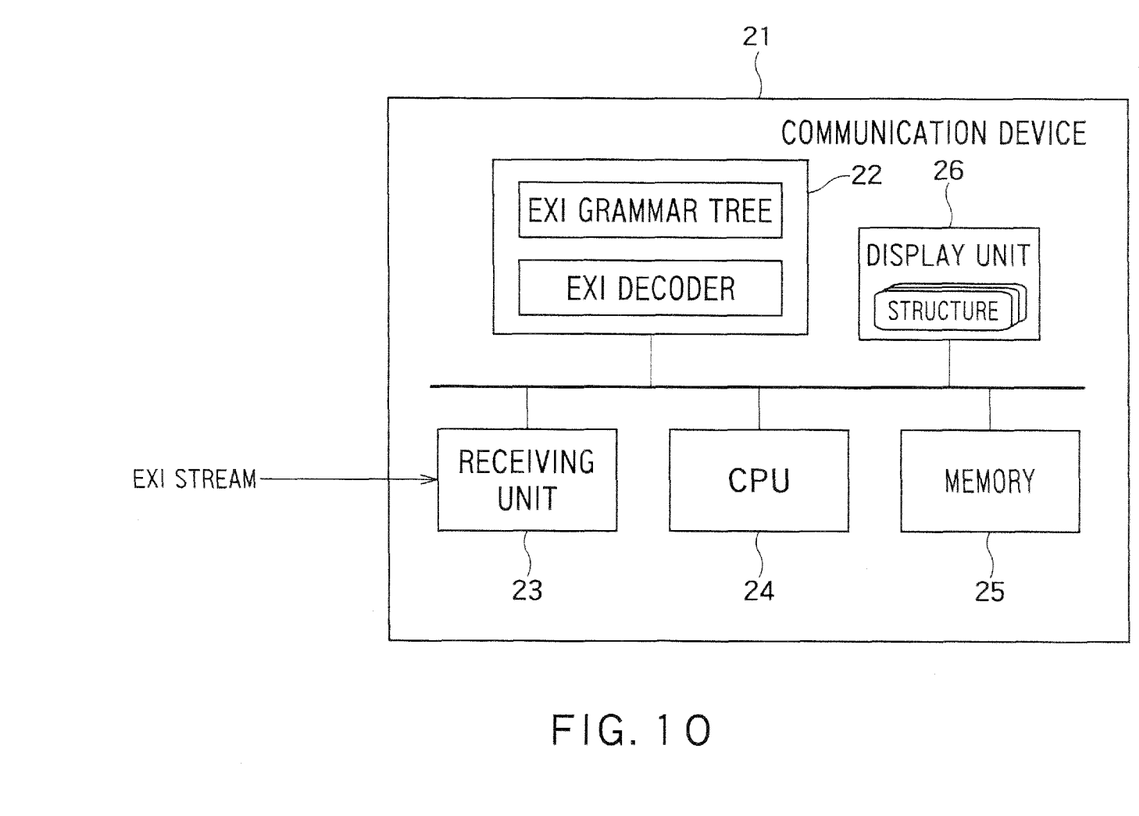
FIG. 10 shows an exemplary configuration of a communication device including the dedicated EXI decoder generated according to the embodiment of the invention.

FIG. 10 shows an exemplary configuration of a communication device including the dedicated EXI decoder generated according to the present embodiment.

The dedicated EXI decoder generated according to the present embodiment is incorporated into a communication device with limited resources, such as a smart meter and a mobile device.

A communication device 21 receives an EXI stream in which contents of an XML document are encoded from another device (not shown) at a receiving unit 23 for efficient exchange of XML documents with the other device. An EXI stream is a sequence of EXI events and values associated with all or some of the EXI events as described above.

A CPU 24, which is a decoding executing unit, loads the dedicated EXI decoder in a storing unit 22 into memory 25 and executes it. In response to the execution, an EXI grammar tree is also read into the memory 25 for use. The EXI grammar tree may be included in the EXI decoder. Execution of the dedicated EXI decoder causes only values of structure elements to be retrieved from the EXI stream.

That is, an EXI event code is identified from the beginning of the EXI stream, and the next grammar for use is selected based on the EXI event code and a preselected grammar (initially a start grammar). If a value is associated with the EXI event code (i.e., if a value is stored following the EXI event code, that is, if the EXI event code is equivalent to a CH or AT event), the value is processed with a function mapped to the grammar that is being used when the EXI event code is obtained (a read function or a skip function). As an exemplary application, the value of an element (a variable) of a structure read out in response to execution of a read function may be output to a displaying unit 26. Values of elements may be stored in the storing unit 22 or other storage medium. Detailed operation of the EXI decoder is already discussed using FIGS. 7, 8, 9, and 2.

The EXI decoder compiler 11 described above enables generation of a dedicated decoder adapted for a particular usage environment, such as for an embedded device, in connection with EXI decoding corresponding to a certain XML schema. The decoder skips portions irrelevant to output and reads only relevant portions and returns them in the form of structures. This eliminates the necessity for an entity that uses the decoder (e.g., a device control program for an embedded device) to deal with the high degree of freedom provided by XML. Consequently, associated configurations as well as the decoder itself can be simplified compared to known EXI decoding schemes. In addition, the decoder can be used with a light processing load.

Note that the decoder compiler 11 can be realized by using a general computer device as basic hardware, for example. That is, each element 12, 13 and 14 included in the decoder compiler 11 may be realized by letting a computer carry out a software (computer program) describing instructions of each process. In this case, the decoder complier 11 can be realized by previously installing the computer program in the computer device or by properly installing, in the computer device, the computer program stored in a non-transitory computer readable medium such as hard disk, memory device, optical disk, etc. or distributed through the network.

A. Sample Data

A.1 Specific Example of a Possible XML Document

```
<?xml>
<order>
    <product sku ="1JB339" color="white">
        <quantity>40</quantity>
        <price>339.50</price>
    </product>
    <product sku="1JB340" color="black">
        <quantity>25</quantity>
        <price>155.0</price>
    </product>
    <product sku="1JB341" color="green">
        <quantity>30</quantity>
        <price>183.95</price>
    </product>
</order>
```

A.2 Example of XML Schema (Cited from Reference Literature 1)

```
<xs:element name="product">
    <xs:complexType>
        <xs:sequence maxOccurs="2">
            <xs:element name="description" type="xs:string" minOccurs="0"/>
            <xs:element name="quantity" type="xs:integer" />
            <xs:element name="price" type="xs:float" />
        </xs:sequence>
        <xs:attribute name="sku" type="xs:string" use="required" />
        <xs:attribute name="color" type="xs:string" use="optional" />
    </xs:complexType>
</xs:element>
<xs:element name="order">
    <xs:complexType>
        <xs:sequence>
            <xs:element ref="product" maxOccurs="unbounded" />
        </xs:sequence>
    </xs:complexType>
</xs:element>
```

A.3 Example of EXI Grammar (Cited from Reference Literature 1) Complete Grammar for Element <Product>

| | Event Code | |
|---|---|---|
| Use_color0: | | |
| AT("color") [schema-typed value] Use_color1 | 0 | |
| AT("sku") [schema-typed value] Use_sku1 | 1 | |
| EE | 2.0 | |
| AT(xsi:type) Use_color0 | 2.1 | |
| AT(xsi:nil) Use_color0 | 2.2 | |
| AT (*) Use_color0 | 2.3 | |
| AT("color") [untyped value] Use_color1 | 2.4.0 | |
| AT("sku") [untyped value] Use_sku1 | 2.4.1 | |
| AT (*) [untyped value] Use_color0 | 2.4.2 | |
| SE(*) Use_sku1_copied | 2.5 | |
| CH [untyped value] Use_sku1_copied | 2.6 | |
| Use_color1: | | |
| AT("sku") [schema-typed value] Use_sku1 | 0 | |
| EE | 1.0 | |
| AT (*) Use_color1 | 1.1 | |
| AT("sku") [untyped value] Use_sku1 | 1.2.0 | |
| AT (*) [untyped value] Use_color1 | 1.2.1 | |
| SE(*) Use_sku1_copied | 1.3 | |
| CH [untyped value] Use_sku1_copied | 1.4 | |
| Use_sku1: | | |
| SE("description") Term_description0,1 | 0 | |
| SE("quantity") Term_quantity0,1 | 1 | |
| EE | 2.0 | |
| AT (*) Use_sku1 | 2.1 | |
| AT (*) [untyped value] Use_sku1 | 2.2.0 | |
| SE(*) Use_sku1_copied | 2.3 | |
| CH [untyped value] Use_sku1_copied | 2.4 | |
| Use_sku1_copied: | | |
| SE("description") Term_description0,1 | 0 | |
| SE("quantity") Term_quantity0,1 | 1 | |
| EE | 2.0 | |
| SE(*) Use_sku1_copied | 2.1 | |
| CH [untyped value] Use_sku1_copied | 2.2 | |
| Term_description0,1: | | |
| SE("quantity") Term_quantity0,1 | 0 | |
| EE | 1 | |
| SE(*) Term_description0,1 | 2.0 | |
| CH [untyped value] Term_description0,1 | 2.1 | |
| Term_quantity0,1: | | |
| SE("price") Term_price0,1 | 0 | |
| EE | 1 | |
| SE(*) Term_quantity0,1 | 2.0 | |
| CH [untyped value] Term_quantity0,1 | 2.1 | |
| Term_price0,1: | | |
| SE("description") Term_description1,1 | 0 | |
| SE("quantity") Term_quantity1,1 | 1 | |
| EE | 2 | |
| SE(*) Term_price0,1 | 3.0 | |
| CH [untyped value] Term_price0,1 | 3.1 | |
| Term_description1,1: | | |
| SE("quantity") Term_quantity1,1 | 0 | |
| EE | 1 | |
| SE(*) Term_description1,1 | 2.0 | |
| CH [untyped value] Term_description1,1 | 2.1 | |
| Term_quantity1,1: | | |
| SE("price") Term_price1,1 | 0 | |
| EE | 1 | |
| SE(*) Term_quantity1,1 | 2.0 | |
| CH [untyped value] Term_quantity1,1 | 2.1 | |
| Term_price1,1: | | |
| EE | 0 | |
| SE(*) Term_price1,1 | 1.0 | |
| CH [untyped value] Term_price1,1 | 1.1 | |

Complete grammar for element <order>

| | Event Code | |
|---|---|---|
| Term_product 0,0 : | | |
| SE("product") Term_product 1,0 | 0 | |
| EE | 1.0 | |
| AT(xsi:type) Term_product 0,0 | 1.1 | |
| AT(xsi:nil) Term_product 0,0 | 1.2 | |
| AT (*) Term_product 0,0 | 1.3 | |
| AT (*) [untyped value] Term_product 0,0 | 1.4.0 | |
| SE(*) Term_product 0,0_copied | 1.5 | |
| CH [untyped value] Term_product 0,0_copied | 1.6 | |
| Term_product 0,0_copied : | | |
| SE("product") Term_product 1,0 | 0 | |
| EE | 1.0 | |
| SE(*) Term_product 0,0_copied | 1.1 | |
| CH [untyped value] Term_product 0,0_copied | 1.2 | |
| Term_product 1,0 : | | |
| SE("product") Term_product 1,0 | 0 | |
| EE | 1 | |
| SE(*) Term_product 1,0 | 2.0 | |
| CH [untyped value] Term_product 1,0 | 2.1 | |

A.4 Schema-to-Structure Mapping Information

```
/order/product <= struct product {
    w_char* sku <- utf2wchar | @sku;
    w_char* color <- utf2wchar | @color;
    int quantity <- utf2int | quantity/text( );
    float price <- utf2float | price/text( );
};
```

The invention claimed is:
1. A decoder compiler device that generates an EXI (Efficient XML (Extensible Markup Language) Interchange) decoder, the EXI decoder decoding an EXI stream which is a sequence of a plurality of EXI event codes and a value, the decoder compiler device comprising:
a first reading unit configured to read mapping information that maps a point in an XML document structure defined by an XML schema to a name of a variable, the XML document structure including a plurality of elements;
a second reading unit configured to read an EXI grammar form including a plurality of grammars each defining a relationship among an event representative of the element in the XML document structure, an EXI event code, and a next grammar for use;
a grammar selecting unit configured to sequentially select grammars in the EXI grammar form from a start grammar such that the grammars are traced in sequence;
an update determining unit configured to update a grammar stack which identifies a current position in the XML document structure each time the grammar is selected and determine whether an updated grammar stack indicates the point shown in the mapping information;
a skip function setting unit configured to set a skip function when the updated grammar stack does not indicate the point in the mapping information, the skip function skipping a value in the EXI stream that corresponds to the position indicated by the grammar stack when the skip function is executed;
a read function setting unit configured to set a read function when the updated grammar stack indicates the point in the mapping information, the read function reading a value in the EXI stream that corresponds to the position indicated by the grammar stack and providing the value to a variable mapped to the point when the read function is executed; and a code composer configured to generate an EXI decoder which includes the skip function and the read function set for the grammars.

2. The device according to claim 1, wherein the variable is an element of a structure.

3. The device according to claim 1, wherein:

the mapping information includes information on a type defined for the point in the XML document structure and a type of the variable, and the read function converts a type of a read-out value to the type of the variable and provides the converted value to the variable.

4. A non-transitory computer readable medium storing a program for producing an EXI (Efficient XML (Extensible Markup Language) Interchange) decoder which decodes an EXI stream, the program being executable by a computer to control the computer to perform functions comprising:

reading-in mapping information that maps a point in an XML document structure defined by an XML schema to a name of a variable, the XML document structure including a plurality of elements;

reading-in an EXI grammar form including a plurality of grammars each defining a relationship among an event representative of the element in the XML document structure, an EXI event code, and a next grammar for use;

sequentially selecting grammars in the EXI grammar form from a start grammar such that the grammars are traced in sequence;

updating a grammar stack which identifies a current position in the XML document structure each time the grammar is selected and determining whether an updated grammar stack indicates the point shown in the mapping information;

setting a skip function when the updated grammar stack does not indicate the point in the mapping information, the skip function skipping a value in the EXI stream that corresponds to the position indicated by the grammar stack when the skip function is executed;

setting a read function when the updated grammar stack indicates the point in the mapping information, the read function reading a value in the EXI stream, that corresponds to the position indicated by the grammar stack and providing the value to a variable mapped to the point when the read function is executed; and generating an EXI decoder which includes the skip function and the read function set for the grammars.

5. A communication device comprising:

a storing unit configured to store an EXI decoder generated according to the decoder compiler device recited in claim 1 and an EXI grammar form;

an executing unit configured to execute the EXI decoder; and a receiving unit configured to receive an EXI stream, wherein the EXI stream is a sequence of a plurality of EXI event codes and a value associated with a part of or all of the EXI event codes, and wherein the executing unit:

sequentially identifies the EXI event code from a beginning of the EXI stream and selects a next grammar for use based on the EXI event code and the grammar;

when the EXI event code is associated with the value, processes the value by executing a skip function or a read function that is mapped to the grammar applied when the EXI event code is identified; and outputs the variable having the value retrieved by the read function.

* * * * *